(12) United States Patent
Langbein et al.

(10) Patent No.: US 11,518,400 B2
(45) Date of Patent: Dec. 6, 2022

(54) METHOD AND DEVICE FOR DETECTING A ROADSIDE OBJECT

(71) Applicant: MOTHERSON INNOVATIONS COMPANY LIMITED, London (GB)

(72) Inventors: Reinhold Langbein, Stuttgart (DE); Lan Wu, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 232 days.

(21) Appl. No.: 16/960,712

(22) PCT Filed: Dec. 20, 2018

(86) PCT No.: PCT/EP2018/086350
§ 371 (c)(1),
(2) Date: Jul. 8, 2020

(87) PCT Pub. No.: WO2019/137788
PCT Pub. Date: Jul. 18, 2019

(65) Prior Publication Data
US 2020/0331490 A1    Oct. 22, 2020

(30) Foreign Application Priority Data
Jan. 9, 2018    (DE) ...................... 10 2018 100 331.5

(51) Int. Cl.
*B60W 50/14*    (2020.01)
*G06K 9/62*    (2022.01)
(Continued)

(52) U.S. Cl.
CPC ........... *B60W 50/14* (2013.01); *G06K 9/6267* (2013.01); *G06V 10/25* (2022.01); *G06V 20/58* (2022.01);
(Continued)

(58) Field of Classification Search
CPC ....... B60W 2050/143; B60W 2420/42; B60W 2420/52; B60W 2510/18; B60W 2510/20;
(Continued)

(56) References Cited

U.S. PATENT DOCUMENTS

| 6,038,496 A | * | 3/2000 | Dobler | ................. G01S 17/931 |
|---|---|---|---|---|
|  |  |  |  | 701/72 |
| 2004/0070509 A1 | * | 4/2004 | Grace | .................... G08B 21/06 |
|  |  |  |  | 340/576 |

(Continued)

FOREIGN PATENT DOCUMENTS

| DE | 102007022523 A1 | 11/2008 |
|---|---|---|
| EP | 2574958 A1 | 4/2013 |
| EP | 3048557 A1 | 7/2016 |

OTHER PUBLICATIONS

International Search Report dated Mar. 20, 2019 of International application No. PCT/EP2018/086350.
(Continued)

*Primary Examiner* — Babar Sarwar
(74) *Attorney, Agent, or Firm* — Jones Day

(57) ABSTRACT

A method for detecting, a roadside object including, a three-dimensional object in the vicinity of a vehicle on a road surface includes recording at least one data set including a plurality of data points associated with a region in a lateral vicinity of the vehicle, the region at least partially including at least one wheel of the vehicle and the road surface, where each data point includes according, to whether it corresponds to the at least one wheel to the road surface or to the roadside object, determining a distance between a data point classified as corresponding to the at least one wheel and a data point classified as corresponding to the roadside object and generating a signal if the distance is below at least one threshold value.

19 Claims, 1 Drawing Sheet

(51) Int. Cl.
   *G06V 10/25* (2022.01)
   *G06V 20/58* (2022.01)
   *G06V 20/64* (2022.01)

(52) U.S. Cl.
   CPC ....... *G06V 20/64* (2022.01); *B60W 2050/143* (2013.01); *B60W 2420/42* (2013.01); *B60W 2420/52* (2013.01); *B60W 2510/18* (2013.01); *B60W 2510/20* (2013.01)

(58) Field of Classification Search
   CPC ..... B60W 50/14; G06K 9/6267; G06V 10/25; G06V 20/56; G06V 20/58; G06V 20/588; G06V 20/64
   See application file for complete search history.

(56) References Cited

U.S. PATENT DOCUMENTS

| | | | | |
|---|---|---|---|---|
| 2010/0253489 | A1* | 10/2010 | Cui | G08G 1/165 340/425.5 |
| 2010/0292886 | A1* | 11/2010 | Szczerba | G01S 13/723 701/31.4 |
| 2011/0308309 | A1* | 12/2011 | Nobis | G01B 11/2755 73/115.07 |
| 2013/0079990 | A1* | 3/2013 | Fritsch | G06V 20/588 701/41 |
| 2015/0234045 | A1* | 8/2015 | Rosenblum | G01S 13/931 342/70 |
| 2016/0207461 | A1* | 7/2016 | Kalms | H04N 7/183 |

OTHER PUBLICATIONS

Written Opinion dated Mar. 20, 2019 of International application No. PCT/EP2018/086350.

\* cited by examiner

METHOD AND DEVICE FOR DETECTING A ROADSIDE OBJECT

CROSS-REFERENCE TO RELATED PATENT APPLICATIONS

This application is a National Stage Entry of International Patent Application No. PCT/EP2018/086350, filed Dec. 20, 2018, which claims the benefit of priority to German Patent Application No. DE 10 2018 100 331.5, filed Jan. 9, 2018, each of which is hereby incorporated by reference in its entirety for all purposes.

BACKGROUND

1. Field of the Invention

The invention refers to a method and a device for detecting a roadside object, in particular in form of a three dimensional object such as a curb, as well as to a vehicle comprising such a device.

2. Related Art

Motor vehicles, especially low-lying sports cars, are in particular danger of being damaged by roadside objects, such as a curb, during the parking process. Contact with the curb can damage parts of the vehicle which are close to the road surface, such as spoilers or the rims of the vehicle's wheels.

To avoid such damage, US 2014/0347485 A1 discloses a system for providing enhanced images of an area in front of the vehicle, in particular during the parking process. While such a system can assist the vehicle driver to avoid hitting a curb or the like with the front spoiler of the vehicle, the view into the front area of the vehicle still leaves the possibility of damage occurring to the wheels, the rims or other lateral vehicle parts.

A vehicle modular side view mirror assembly is disclosed in WO 2017/124038, with a mirror base that has a first section capable of attachment to a vehicle and a second section capable of attachment to a mirror head, wherein the second section is movable relative to the first section. The mirror assembly can include a mirror head having a reflective surface and a motor for moving the mirror head relative to a mirror base, the mirror head detachably connectable to the mirror base. Lidar sensors can be mounted in addition to, or in place of, the side view mirrors. Interchangeable modular heads can allow a user to customize the vehicle to have mirror heads, sensors, both, or neither. Mirror bases can move, allowing the mirrors and/or sensors to be positioned at different angles. In some configurations, the position of the sensors can be dynamically adjusted according to the speed and/or direction of the vehicle.

Cameras that may be included on the vehicle are a rearward facing camera, a downward facing camera, a sideward facing camera, a forward facing camera, and/or a periphery camera according to WO 2017/124038 such that a portion of a 360-degree view of the vehicle's surroundings is provided. The rearward facing camera can emulate the perspective provided by a typical side view mirror. The periphery camera images the area on the driver side of the vehicle. Images from the downward facing camera can assist a user in viewing a curb when parallel parking and also can be used in a guidance system that warns a driver when the vehicle is drifting out of a driving lane.

The term "side view" or "rear view" is here defined as a view of the surrounding area, which is not in the field of view of a driver, i.e. the directions opposing, left, right, below and above of the viewing direction, but can also comprise the view in the direction of the viewing direction of the driver and/or any combinations of the directions.

The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or entity within or outside of the vehicle.

Different functions and devices can be incorporated into and/or controlled with the help of rear view devices. Of particular interest are functions and devices to enhance, extend and/or sustain the functionality of the rear view device during normal or extreme conditions. This can comprise heating and/or cooling means, cleaning means such as wipers, liquid and/or gaseous sprays, actuator means for moving the rear view device or parts of it, such as for example a display, a camera system and/or parts of a camera system, comprising for example lenses, filters, light sources, adaptive optics like deformable mirrors, sensors and/or mirrors, and/or actuator means for inducing movement of other objects, for example parts of the vehicle and/or objects surrounding the vehicle. Furthermore it can comprise linear tracks and/or rotating wheels, like for example a filter wheel, for exchanging optical elements, comprising for example lenses, mirrors, light sources, sensors, adaptive optics like deformable mirrors and/or filters.

Prominent examples for functions and devices incorporated into and/or controlled with the help of rear view devices comprise illumination devices, for example any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rear view devices can comprise for example a tiredness detection system, a micro-sleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, comprising for example an ejection seat system, a direction indicator, a blind spot indicator, an approach system, a strong braking system, an emergency braking system, a charging status indicator, a vehicle mode system, comprising for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

A camera module to be used in a rear view device can comprise a plurality of different optical elements, a.o. a variety of sensors and light sources, as well as housing parts. The housing of a camera module can be made out of plastic, metal, glass, any other suitable material and/or any combinations thereof and can be used in combination with the techniques described below to change or modify the properties of the material or the material surface. Housings are for example described in German patent application No. 102016108247. Further, the camera can comprise for example CCD or CMOS or light field sensors, as for example described in German patent application No. 102011053999. Also an area of the sensor can be reserved for different purposes, for example to detect a test beam, as described in U.S. Pat. No. 8,031,224, which is hereby incorporated by reference in its entirety for all purposes. The camera module can also be equipped with apparatuses for light intensity adjustment as described for example in U.S. patent application No. 14/809,509, which is hereby incorporated by reference in its entirety for all purposes, and light level intensifier tubes as described in U.S. patent application Ser. No. 09/771,140, which is hereby incorporated by reference in its entirety for all purposes. Still further, the camera module or a cover adapted to the camera module can be moved using different actuators, drives and/or a flexible track, as for example described in German application No. 102016108247.3.

The camera module can also comprise cleaning elements to clean the optical element facing outwards and being exposed to the environment. The cleaning element can for example comprise wipers, brushes, lips, nozzles, fans and similar elements as are described in European patent application No. 14165197.6, European patent application No. 13163677.1, and European patent No. 1673260 corresponding to US patent application No. 2007/273971, each of which is hereby incorporated by reference in its entirety for all purposes. The cleaning devices are not limited in composition, and may for example comprise any fabric, elastomeric, sponge, brush, or combination of these. Special wiper elements comprising wiper arms, wiper blades, wiping cloth, wiping tissue and combinations thereof are described in European patent application No. 14165197.6. A reservoir for holding a cleaning liquid is described in European patent application No. 14165197.6. Such a reservoir can be attached to or integrated into the camera module to provide the cleaning liquid to the optical elements of the camera module. Different methods may be used to detect dirt or other obscurations preventing or reducing the functioning of the camera module, such as described in U.S. Pat. No. 8,395,514, European patent No. 1328141, and U.S. Pat. No. 8,031,224, each of which is hereby incorporated by reference in its entirety for all purposes. Also light sources can be installed or integrated into the camera module to increase the visibility of surrounding objects, measure distances and directions and detect dirt, such as described in U.S. Pat. No. 8,031,224, U.S. patent application No. 62/470,658, and U.S. patent application Ser. No. 09/771,140, each of which is hereby incorporated by reference in its entirety for all purposes.

Different heating means, like heating coils, heating devices integrated into the lens holder or the bezel, or other heating elements can be used to impede condensation and icing at the surface of optical elements, as for example described in German patent application No. 102016108247.3, U.S. patent application No. 62/470,658, and German patent application No. 102016107545.0, each of which is hereby incorporated by reference in its entirety for all purposes.

A watertight seal against weather effects, as well as against the influence of washing processes with detergents, solvents and high pressure cleaners can be used on the housing of the camera module as described in U.S. patent application Ser. No. 13/090,127, which is hereby incorporated by reference in its entirety for all purposes. Alternatively, the housing can be made of a body comprising plastic and conductive material, wherein the conductive material is dispersed in the plastic material to form a conductive mass to allow a power source, preferably a DC voltage source, to connect via at least two electrodes to the body and heat the body accordingly, as described in German patent application No. 102016107545.0. Different types of fixings can be used to fix the camera module to the vehicle or other components, such as for example the snap-fit connection described in U.S. Pat. No. 8,979,288, which is hereby incorporated by reference in its entirety for all purposes.

Thus, rear view devices are widely known from the prior art, in particular in the form of rear view mirrors. They generally comprise a base, which is affixed to a vehicle, and a head which carries at least a mirror glass and/or a camera and often additional elements such as side turn indicators or the like. The head is usually mounted pivotally movable with respect to the base. This allows the head to move out of the way in case of a minor collision, thereby preventing damage to the head or injury to pedestrians who get hit by the rear view device. Furthermore, the head can be pivoted, either manually or by means of an automatic folding system, from an operating position, in which the rear view device enables the driver of the vehicle to receive a view in particular to the back, to a parking position, in which the head is folded against the side of the vehicle. This reduces the lateral extent of the vehicle with the mirror in the parking position and prevents accidental damage to the mirror of a parked vehicle.

Shape memory alloys (SMA) are used for various functions with rear view devices. US patent application No. 2016/347252, which is hereby incorporated by reference in its entirety for all purposes, relates to an actuator device for a rear view device of a motor vehicle comprising: at least one retaining element; at least one adjusting element which can be transferred into a plurality of functional positions, in particular from a parking position into at least one operating position; at least one driving means which comprises at least one shape-memory element which is, in particular, in the form of a wire, which extends between the retaining element and the adjusting element and can be or is secured to both, where the extension of said shape-memory element can be modified on being actuated, in particular on being electrically energized, and by means of the modification of the extension of which the at least one adjusting element can be transferred from one functional position into another functional position, in particular from the parking position into the operating position or vice versa; at least one heat-conducting means which lies in contact with the driving means at least in the end position of the adjusting element; and wherein at least one switching means, by means of which the at least one driving means and the at least one heat-conducting means can be or are arranged with respect to one another with no contact in the basic position of the adjusting element and/or by means of which the at least one driving means and the at least one heat-conducting means can be or are arranged touching one another at least in sections at least in the end position of the adjusting element. A further actuator for an exterior rear view mirror of a vehicle is known from European patent application No. 2781743 and has at least one actuator pin, at least one drum body enclosing a cavity, in which the actuator pin can be arranged or is arranged in a non-rotational manner, at least one clamping means which comprises at least one shape-memory element which can be fixed or is fixed to the drum body and with which the drum body can be moved in a first rotational direction, and at least one return means which comprises at least one shape-memory element which can be fixed or is fixed to the drum body and with which the drum body can be moved in a second rotational direction, characterized in that the clamping means and/or the return means can be fixed or are fixed on a winding portion of the drum body and in the winding portion of the drum body at least quarter of a winding, in particular at least half a winding, in particular an entire winding, in particular several windings are applied.

It is the problem underlying the present invention to provide a method and a device for detecting roadside objects, which are particularly suited to avoid damage in the lateral region of the vehicle, especially damage to the wheels or rims. It is furthermore an object of the present invention to provide a vehicle with such a device.

SUMMARY

This problem is solved by a method for detecting a roadside object, in particular a curb, in the vicinity of a vehicle on a road surface, the method comprising the steps of recording at least one data set comprising a plurality of data points associated with a region in a lateral vicinity of the vehicle, the region at least partially including at least one wheel of the vehicle and the road surface, wherein each data point includes information regarding its relative position with respect to the vehicle;

classifying each data point according to whether it corresponds to the at least one wheel, to the road surface or to the roadside object;

determining a distance between a data point classified as corresponding to the at least one wheel and a data point classified as corresponding to the roadside obstacle; and generating a signal if the distance is below at least one threshold value.

Monitoring the lateral area of the vehicle according to the invention allows for the detection of dangerous closeness between the vehicle's wheels and roadside obstacles, such as a curb, so that the driver of the vehicle can be alerted to possibly damaging situations.

The distance between two data points is herein defined as the shortest possible line between the coordinates indicated by the information regarding the relative position of the data points with respect to the vehicle.

A "signal" in the sense of the present invention is primarily the output of a code block or hardware block tasked with the monitoring of the distance between the wheels and the roadside object. The invention is thus not limited to specific ways in which the signal generated in this manner is later utilized.

It is preferred according to the invention that the recording step is performed by a device mounted to the vehicle and comprising at least one sensor, which is preferably selected from a group comprising at least one camera, time-of-flight camera, a Laser sensor and/or LIDAR sensor. Further, the recording step can comprise moving of the sensor relative to the vehicle (10), in particular for scanning the region at least in one direction. A scanning interval can be set, preferably depending on the motion of the vehicle, with the scanning interval in particular being about 1/10 second when the vehicle is in motion.

All of the named sensors can provide a high resolution, detailed data set regarding the lateral environment of the vehicle.

With the invention it is proposed that the region is suited for recording data points from the front to the rear wheels in parallel to the longitudinal axis on the vehicle, which defines the x direction, preferably on the driver side and/or the non driver side of the vehicle. The recoding angel in the x direction can be up to 180°, in particular about 120°, and/or the recoding range in the x direction can be up to 10 m, preferably around 5 m.

It is also proposed that the region is suited for recording data points perpendicular to the longitudinal axis on the vehicle, which defines the y direction, preferably within a range of up to 30 cm and/or a recoding angel of up to 45°, in particular of about 15°.

Still further, it is proposed that the region is suited for recording data points for determining a height above the road surface, which defines the z direction, preferably within a range of up to 30 cm, in particular of up to 10 cm.

The sensor can have a viewing range in x direction and can be moved for scanning the region in y and/or z direction. The sensor can be calibrated to cover the region, which preferably can be selected and/or changed.

It is preferred according to the invention that the classifying step comprises the allocation of at least a part of the plurality of data points to a data grid, with the data grid being at least 2 dimensional. The data grid can comprise n rows and m columns, wherein preferably n is selected to be between 1 and 20 in the x direction, and/or preferably m is selected to be between 10 and 100 in the y direction.

In case n=1, the sensor can be operated by storing older measurements. A self learning can even be achieved in this manner.

The invention proposes that each data point includes information characteristic for a relative elevation or height above the road surface and/or a color and/or a change as a function of time, with preferably each data point being classified based on said information.

Relevant roadside objects, like a curb, differ from the road surface in their elevation, so that a simple three-dimensional elevation map can be sufficient to determine the presence of such obstacles. Moreover, the method is not limited to detecting the curb in this manner, but rather can also be utilized to identify other lateral obstacles such as potholes, objects on the road surface or the like. The same can be achieved by analysing the colour distribution over the data set, for example by detecting colour differences between the road surface, which is usually black tarmac or the like, and the lighter colour of the curb, which is in most cases constructed from light stones, such as for example granite, or from concrete.

By recording data points repeatedly, in particular at least ten times per second, the relative position of the vehicle, especially its wheels, and possible roadside objects can be continuously monitored, so that a warning for the driver or an active driver assist system interruption can be provided in a timely manner.

Each grid point of the grid can be classified either into
a first category M1, comprising data points which correspond to one of the wheels of the vehicle, a second category M2 corresponding to the road surface, and a third category M3 corresponding to the object.

As detailed above, colour differences or elevation differences are usually sufficient to determine the presence of roadside objects which could pose a danger for the wheels or the rims of a car. Since the colour of the tires is usually known, the method can be calibrated in a particularly easy way to perform a reliable classification as to the position of the wheels of the car itself. Moreover, the movement of the wheels, i.e. a detectable rotation, can be employed for this determination.

For example, the black color of the tire, the metal color of the rim and/or the rotational movement of a wheel can be used to classify recorded data points as belonging to the first category M1. A zero elevation and/or patterns of moving can be used to classify recorded data points as belonging to the second category M2. With respect to classify recorded data points as belonging to the third category M3, a characteristic elevation of e.g. more than 2 cm can be taken into consideration.

In addition, the generating step can comprise generating an audible, visible and/or haptic warning signal for the driver of the vehicle and/or generating a signal to a driver assist system, in particular a signal instructing the driver assist system to perform a steering and/or braking action.

The driver can in this manner be alerted to potential dangers to the wheels or rims of his vehicle. The warning can even be directional to make the driver easily understand in which direction to steer.

It is further possible to correlate an intensity of the signal output to the amount of present danger. For example, the shorter the distance between the wheels and the curb is, the louder or more intensive the signal output can become.

But the invention can also be employed to provide automatic preventive action in case of the driver missing the risk or being in immediate danger of damaging his own vehicle by contact to a roadside object.

As there is the possibility to actively intervene in the vehicle steering, all the involved components have to comply to functional safety requirements.

Also there can be the possibility that several sensors are used, e.g. one on each side of the vehicle, in particular integrated in both external rear view devices, such that it can be determined whether there is enough room for a curb-avoiding steering manoeuvre and an intervening only takes palace if there is no collision possible.

The generating the signal in form of a warning signal can be suppressed if a velocity of the vehicle is lower than a predetermined value and/or depend on the motion of the vehicle and/or the said information and/or the determined distance.

Thus, the severity of the warning can be increased in particular depending on the location of the determined obstacle within the data grid.

As the output of the warning signal can be suppressed if a velocity of the vehicle is lower than a predetermined value, unnecessary distractions of the driver when the vehicle is at rest or in a very low parking speed, is avoided.

The invention also relates to a device for detecting a roadside object, in particular a curb, in the vicinity of a vehicle on a road surface, with a control circuit adapted to perform the method according to the invention.

The advantages discussed above come to bear in the same manner regarding such a sensor device.

Said device can be integrated at least partly in an external rear view device and/or a door sill.

This allows for a direct view of the relevant lateral region of the vehicle.

The invention further relates to a vehicle with a device of the described manner.

BRIEF DESCRIPTION OF THE DRAWINGS

In the following, the invention and its embodiments are further explained with regard to the drawings, which show in.

DETAILED DESCRIPTION

Figure 1:
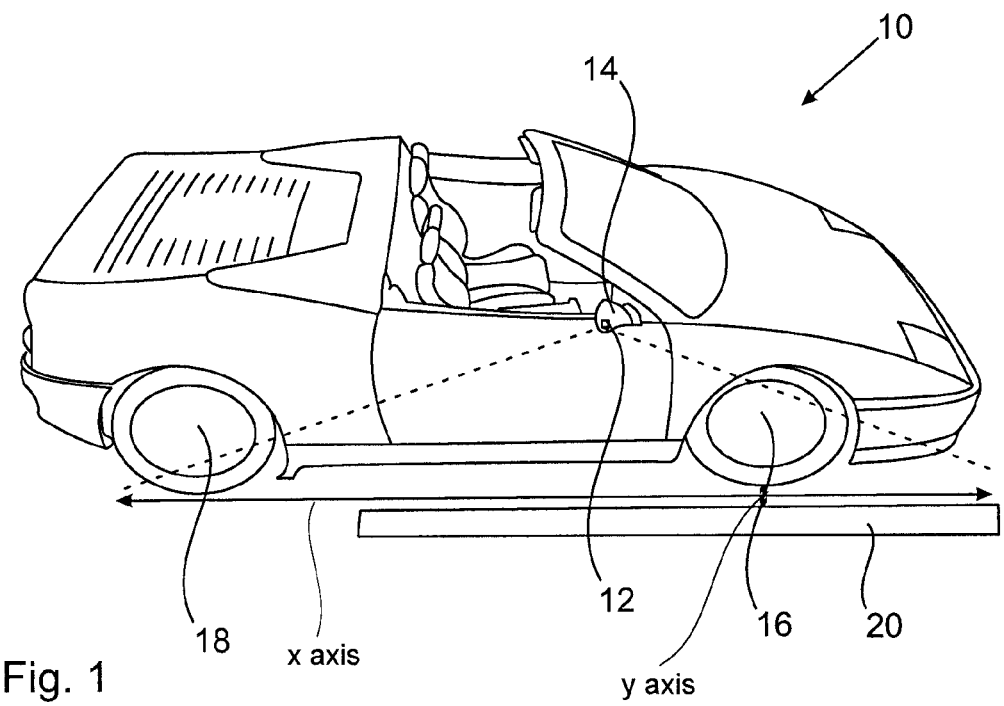
FIG. 1 is a schematic representation of a vehicle with an embodiment of a device for detecting roadside objects according to the present invention.

A motor vehicle 10 comprises a device 12 arranged in a rear-view device 14, which is a rear-view mirror in the example shown. The device 12 comprises at least one camera, one time of flight camera and/or one lidar sensor recording a data set corresponding to a lateral area of the vehicle 10, said lateral area at least including a front wheel 16 and/or a rear wheel 18 of the vehicle 10 and a roadside object, in particular in form of a curb 20.

A calibration of the device 12 is preformed such that data from the lower part of the wheels 16, 18, the road surface and the curb 20 can be obtained.

Figure 2:
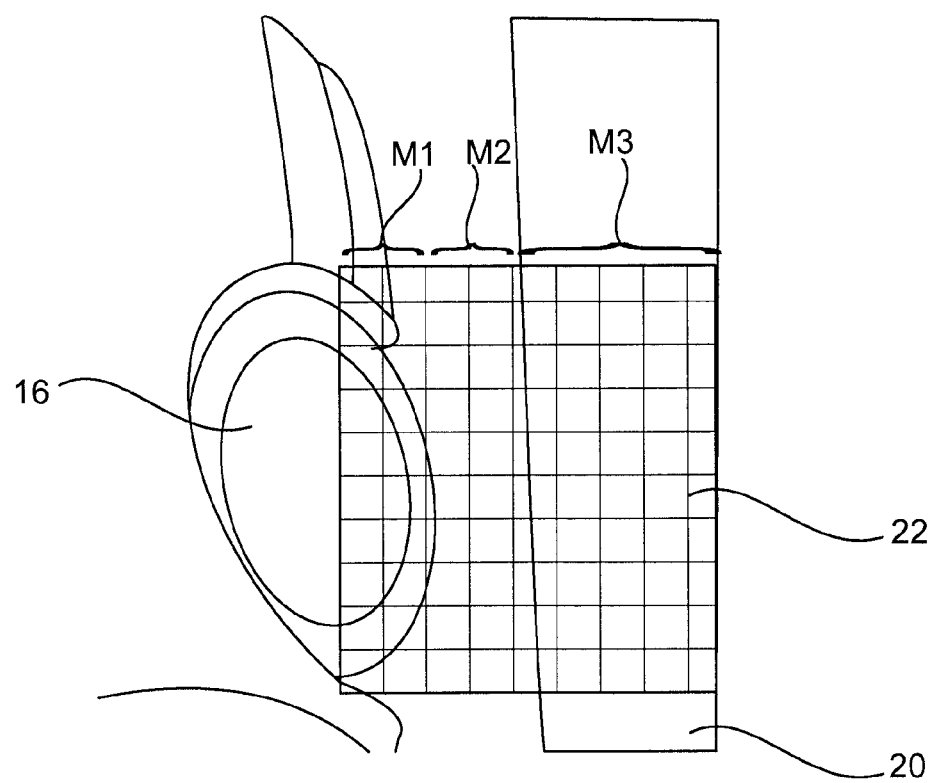
FIG. 2 is a schematic view of the field of view of a sensor of the device of FIG. 1.

As can be seen from FIG. 2, the field of view of the sensor 12 is partitioned into a data grid 22 consisting of n rows running substantially parallel to the longitudinal axis of the vehicle 10 (x direction) and m columns perpendicular thereto (y direction). The grid 22 is defining a data point cloud. It is shown with 10 rows and 9 columns in FIG. 2. Each grid point of the grid 22 is classified either into a first category M1 (in columns m1+m2), comprising data points which correspond to one of the wheels 16, 18 of the vehicle 10, a second category M2 (in columns m3+m4) corresponding to a road surface, and a third category M3 (columns m5–m9) corresponding to the curb 20 or, if necessary, other roadside objects to be detected.

The classification of the data points of the grid 22 can be performed based on an elevation map, on the colour of individual data points and/or on the temporal variation between individual data points during multiple recordings by the device 12.

In order to avoid a possibly dangerous interaction between the wheels 16, 18 and the curb 20, the minimum distance between the data points classified within the categories M1 and M3 is determined at regular intervals, for example every ¹/₁₀ second. If the distance between such data points, i.e. the distance between one of the wheels 16, 18 and the curb 20, is lower than a predetermined value, a signal is generated.

Such a signal can then further be processed to force the output of a visual or auditory warning to a driver of the vehicle 10 in order to prevent him from hitting the curb 20 with the wheels 16, 18 of the vehicle 10. It is further possible to use the generated signal as input for a driver assist system, so as to force an active intervention in the steering or breaking process of the vehicle 10 in order to avoid damage to the wheels 16, 18 or their rims.

If the classification of the data points in the data grid 22 is based on a height map, the curb 20 can be distinguished from the road surface for example by a given minimum height deviation, for example 2 cm or more. In contrast, the road surface, classified within the category M2, is generally characterized by a rather homogenous height distribution, i.e. with height differences lower than 2 cm. Of course, the particular values or amount can be adjusted to take specific local road conditions or the like into account.

As can be seen from FIG. 1, the field of view of the sensor 12 preferably includes both front and rear wheels 16, 18 of the vehicle 10. In other words, the field of view extends over the whole wheel base of the vehicle 10 with a viewing angle of around 120° in x direction. The viewing angle in y direction can be around 15°. In order to determine the height of the curb 20, the sensor 12 provides a 3 dimensional view.

In summary, the present invention provides a method and a device 12 particularly suited for detecting roadside objects 20 like a curb and generating a warning signal after such a detection in order to prevent inadvertent damage to the vehicle 10 by contact with such roadside objects 20.

The features disclosed in the claims, the specification, and the drawings maybe essential for different embodiments of the claimed invention, both separately or in any combination with each other.

Reference Signs
10 vehicle
12 sensor device
14 rear view device
16 wheel
18 wheel
20 curb
22 grid
M1 . . . M3 category

What is claimed is:

1. A non-transitory computer-implemented method for detecting a roadside object comprising a three-dimensional object in the vicinity of a vehicle on a road surface, the method comprising:
recording in a data grid at least one data set comprising a plurality of data points associated with a region in a lateral vicinity of the vehicle, the region at least partially including at least one wheel of the vehicle and the road surface, wherein each data point includes information regarding its relative position with respect to the vehicle, wherein the recording is performed by a device mounted to the vehicle, the device comprising at least one sensor;
classifying each data point in the data grid according to whether it corresponds to the at least one wheel to the road surface or to the roadside object;
determining a distance between the at least one wheel and the roadside object based on a number of data points in the data grid between a data point classified as corresponding to the at least one wheel and a data point classified as corresponding to the roadside object; and
generating at least one of an audible, visible, or haptic warning signal for the driver of the vehicle if the distance is below at least one threshold value.

2. The method according to claim 1, wherein the at least one sensor comprises at least one of a camera, a time-of-flight camera, a Laser sensor, and a LIDAR sensor.

3. The method according to claim 2, wherein the recording step comprises moving of the sensor relative to the vehicle for scanning the region at least in one direction.

4. The method according to claim 3, wherein a scanning interval is set, depending on a motion of the vehicle, with the scanning interval being about $\frac{1}{10}$ second in response to the vehicle being in motion.

5. The method according to claim 1, wherein the at least one wheel includes at least one front wheel and at least one rear wheel, wherein the region is suited for recording data points from the at least one front wheel to the at least one rear wheel in parallel to a longitudinal axis on the vehicle, which defines an x direction, on at least one of a driver side and a non-driver side of the vehicle.

6. The method according to claim 5, wherein at least one of a
recoding angle in the x direction is at least 180° or about 120°, and a
recoding range in the x direction is at least 10 m or about 5 m.

7. The method according to claim 5, wherein the at least one sensor has a viewing range in the x direction, and is moved for scanning the region in at least one of a y direction and a z direction.

8. The method according to claim 1, wherein the region is suited for recording data points perpendicular to a longitudinal axis on the vehicle, which defines a y direction, within at least one of a range of at least 30 cm and a recoding angle of at least 45° or about 15°.

9. The method according claim 1, wherein the region is suited for recording data points for determining a height above the road surface, which defines a z direction, within a range of at least 30 cm or at least 10 cm.

10. The method according to claim 1, wherein the at least one sensor is calibrated to cover the region, and can be at least one of selected and changed.

11. The method according to claim 1 wherein the data grid is at least 2 dimensional.

12. The method according to claim 11, wherein the data grid comprises n rows and m columns, and at least one of:
n is selected to be between 1 and 20 in an x direction, and
m is selected to be between 10 and 100 in a y direction.

13. The method according to claim 11, wherein each grid point of the data grid is classified into at least one of:
a first category comprising data points which correspond to one of the wheels of the vehicle,
a second category corresponding to the road surface, and
a third category corresponding to the object.

14. The method according to claim 1,
wherein each data point includes information, comprising at least one of:
a relative elevation or height above the road surface;
a color; and
a change as a function of time, and
each data point is classified based on the information.

15. The method according to claim 1, wherein the generating step further comprises generating a signal to a driver assist system comprising a signal instructing the driver assist system to perform a steering or braking action.

16. The method according to claim 1, wherein generating the signal in form of a warning signal is suppressed if at least one of a velocity of the vehicle is lower than a predetermined value, or depends on at least one of the motion of the vehicle, information acquired by the at least one sensors, and the determined distance.

17. A device for detecting a roadside object in the vicinity of a vehicle on a road surface, the device being integrated at least partly in at least one of an external rear view device and a door sill, the device including at least one sensor and a control circuit adapted to perform a method comprising:

recording by the at least one sensor at least one data set in a data grid comprising a plurality of data points associated with a region in a lateral vicinity of the vehicle, the region at least partially including at least one wheel of the vehicle and the road surface, wherein each data point includes information regarding its relative position with respect to the vehicle;

classifying by the control circuit each data point in the data grid according to whether it corresponds to the at least one wheel to the road surface or to the roadside object;

determining by the control circuit a distance between the at least one wheel and the roadside object based on a number of data points in the data grid between a data point classified as corresponding to the at least one wheel and a data point classified as corresponding to the roadside object; and generating at least one of an audible, visible, or haptic warning signal for the driver of the vehicle if the distance is below at least one threshold value.

18. A vehicle comprising a device for detecting a roadside object in the vicinity of a vehicle on a road surface, the device including at least one sensor and a control circuit adapted to perform a method comprising:

recording by the at least one sensor at least one data set in a data grid comprising a plurality of data points associated with a region in a lateral vicinity of the vehicle, the region at least partially including at least one wheel of the vehicle and the road surface, wherein each data point includes information regarding its relative position with respect to the vehicle;

classifying by the control circuit each data point in the data grid according to whether it corresponds to the at least one wheel to the road surface or to the roadside object;

determining by the control circuit a distance between the at least one wheel and the roadside object based on a number of data points in the data grid between a data point classified as corresponding to the at least one wheel and a data point classified as corresponding to the roadside object; and generating at least one of an audible, visible, or haptic warning signal for the driver of the vehicle if the distance is below at least one threshold value.

19. The vehicle according to claim 18, wherein the control circuit is comprised by the central vehicle control system.

* * * * *